United States Patent [19]

Nachtman et al.

[11] Patent Number: 5,082,500

[45] Date of Patent: Jan. 21, 1992

[54] SPRAYABLE COMPOSITION

[75] Inventors: Thomas Nachtman, Temperance; John Hull, Toledo; Patrick O'Shea, Hanover, all of Mich.

[73] Assignee: Newastecon, Inc., Perrysburg, Ohio

[21] Appl. No.: 639,285

[22] Filed: Jan. 10, 1991

Related U.S. Application Data

[63] Continuation-in-part of Ser. No. 350,599, May 10, 1989, abandoned.

[51] Int. Cl.$^5$ ............................................. C09J 4/00
[52] U.S. Cl. .................................... 106/900; 106/203; 106/204; 106/170; 52/3; 47/9
[58] Field of Search ............... 106/203, 204, 170, 900; 52/3; 47/9

[56] References Cited

U.S. PATENT DOCUMENTS

| | | | |
|---|---|---|---|
| 2,961,797 | 11/1960 | Bonanno | 46/244 |
| 3,763,072 | 10/1973 | Krieger | 260/29.6 |
| 3,772,893 | 11/1973 | Eilers | 61/36 R |
| 3,812,615 | 5/1974 | Jamison | 47/9 |
| 3,895,956 | 7/1975 | Yoshida et al. | 106/287 S |
| 3,986,365 | 10/1976 | Hughes | 61/36 C |
| 4,232,480 | 11/1980 | Videen | 47/9 |
| 4,297,810 | 11/1981 | Hansford | 47/9 |
| 4,369,597 | 1/1983 | Leep et al. | 47/9 |
| 4,414,776 | 11/1983 | Ball | 47/9 |
| 4,432,666 | 2/1984 | Frey et al. | 106/900 |
| 4,600,744 | 7/1986 | Libor et al. | 524/446 |
| 4,787,928 | 11/1988 | Balassa | 71/23 |

FOREIGN PATENT DOCUMENTS 2851701 6/1980 Fed. Rep. of Germany.

OTHER PUBLICATIONS

Natrosol Brochure from Hercules Incorporated, Copyright 1990.

IMV Brochure on "Imvitone Organoclays & Clay Products" Copyright 1990.

*Primary Examiner*—Mark Bell
*Assistant Examiner*—Deborah Jones
*Attorney, Agent, or Firm*—MacMillan, Sobanski & Todd

[57] ABSTRACT

A sprayable composition and a method of protecting material with the composition is disclosed. The composition comprises a polymer such as hydroxyethyl cellulose, clay, and water to provide a cover layer which, after spraying, is tough, flexible and water-repellent. Other materials such as shredded paper and gypsum can be used in the cover layer. The composition is effective as a cover layer over material such as soil, refuse at a dump site, or grain in a stockpile.

34 Claims, No Drawings

SPRAYABLE COMPOSITION

CROSS REFERENCE TO RELATED APPLICATION

This application is a continuation-in-part of U.S. patent application Ser. No. 07/350,599, filed May 10, 1989, now abandoned.

BACKGROUND OF THE INVENTION

The present invention relates to a sprayable composition comprising a water-soluble polymer and clay, and to a method of spraying the composition for covering a material to be protected such as soil, refuse at a disposal site, or other material in a stockpile to form a protective water-resistant layer thereover.

U.S. Pat. No. 3,763,072 to Krieger discloses a composition comprising an aqueous acrylic latex emulsion and sodium silicate for forming a crust on soil.

U.S. Pat. No. 2,961,799 discloses a composition comprising a spray latex (styrene/butadiene) and clays for protecting soil from erosion.

There is a need for a sprayable composition to form a protective, water-resistant layer over material, and a method of using the composition to cover, for example, the upper layer of refuse at a disposal site, the composition preferably having the following advantages:

1) easily sprayed at ambient temperature;
2) does not mist in the air when sprayed;
3) tacks down dust or papers that are blown unwantedly by wind;
4) becomes water-resistant when cured and set up after spraying;
5) resists cracking even in hot temperature including temperatures above 100° F.;
6) after setting up, the sprayed layer has decreased surface penetration by precipitation;
7) daily cover layers biodegrade and break up to permit leachate collection;
8) reduces volatile emissions and controls odor.

SUMMARY OF THE INVENTION

The present invention provides a sprayable composition for forming a cover layer over material to be protected such as, for example, (1) soil, (2) refuse at a disposal site, a sanitary landfill, or hazardous material landfill, or (3) a stockpile of material such as grain, salt or coal. When used over soil, the composition can function as both a means of providing erosion control and/or a means for distributing seed and fertilizer over the soil. The composition comprises:
(a) a water soluble polymer such as cellulosic polymer;
(b) clay; and
(c) a carrier such as water for the polymer and clay, such that the composition, after spraying, becomes water-resistant, tough and flexible The present invention also provides a method of using the above described sprayable composition to form a cover layer over material, the method comprising:
(a) spraying such a composition at ambient temperature over the material to form a layer of thickness sufficient to cover and protect the top of the material for a predetermined period of time; and
(b) protecting the material by allowing the layer to set up and form a water-resistant, tough and flexible cover layer.

A binder is preferably used in the composition to provide mass and toughness, a preferred binder being a fibrous mass such as shredded paper and/or wood.

Other materials are advantageously added to the composition such as one or more of the following additives: a surfactant, gypsum, a glue, an anti-foam agent, borax, a dye, and an odor control agent.

It is therefore an object of the present invention to provide a sprayable composition as described above, and an easily used, economical method of protecting a selected material by spraying the composition over the material to form a water-resistant, tough and flexible cover layer.

Other objects of the present invention will be apparent to one skilled in the art from reading the following description of the preferred embodiment.

DETAILED DESCRIPTION OF THE INVENTION

The following sprayable compositions have been found to be useful to provide the new and outstanding cover layer:

|     | Ingredients | Pounds |
| --- | --- | --- |
| (a) | Cellulosic Polymer | 5 to 50 |
| (b) | Bentonite | 25 to 200 |
| (c) | Paper | 10 to 100 |
| (d) | Surfactant | 5 to 50 |
| (e) | Glue | 5 to 25 |
| (f) | Gypsum | 5 to 100 |
| (g) | Water | 2000 to 8000 |

The preferred composition contains the following ingredients in approximate pounds:

| Ingredients | Pounds |
| --- | --- |
| Cellulosic Polymer | 15-25 |
| Bentonite | 80-120 |
| Shredded Paper | 25-75 |
| Water | 4500-6000 |

A very successful composition has been found to have the following ingredients in approximate pounds:

| Ingredients | Pounds |
| --- | --- |
| Cellulosic Polymer | 20 |
| Bentonite | 100 |
| Shredded Paper | 50 |
| Water | 4800-5800 |

In general, very useful cover layers have been formed from a composition comprising:
(a) a noniomic water soluble polymer of cellulose that is a hydroxyethyl ether of cellulose having a viscosity of about 100 to 5000 (Brookfield-#3 spindle);
(b) bentonite;
(c) shredded paper;
(d) a noniomic surfactant that is an ethoxylatednonylphenol;
(e) a glue;
(f) gypsum, and
(g) water In the present invention, the polymer is preferably a solvent soluble cellulosic polymer that preferably is a water-soluble cellulosic polymer having a viscosity of generally about 100 to 5,000 and preferably 500 to 2,000 (Brookfield-#3 spindle).

Solvent soluble cellulosic polymers are known in the art and available commercially, such as Cellobrand TM HEC water-soluble hydroxyethyl cellulose (trademark of the British Pilsylin Company—BP Chemicals, Ltd.) as set forth in their bulletin, September 1982, 3625 162 7000, entitled Cellobond HEC hydroxyethyl cellulose, water-soluble polymer. Another very useful cellulosic polymer is Natrosol TM hydroxyethyl cellulose (a trademark of Hercules Incorporated) as set forth, for instance, in their brochure dated 1980 entitled "Natrosol TM Hydroxyethyl Cellulose, a Nonionic Water Soluble Polymer".

A preferred polymer is Natrosol HHR-250 (Hercules) as are other Natrosol 250 polymers as well as Natrosol 150 and 300 polymers. Natrosol is produced in four levels of hydroxyethyl molar substitutes; 1.5, 1.8, 2.5 and 3.0, the polymers being designated 150, 180, 250 and 300, respectively.

As previously indicated, clay is preferably used with the polymer. As known in the art, clay comprises a group of crystalline, finely divided earthy materials generally considered to be hydrates of alumina and silica, with iron oxide and magnesia as common minor components. Bentonite clay is preferred, although kaolin, attapulgite and montmorillonite can be used. Suitable clays are set forth in an IMV bulletin entitled MVI-TONE TM organoclays and clay products, Bentonite-Hectorite-Saponite-Sepcolite. IMV is a division of Gulf Resources and Chenuet Corp. A suitable bentonite clay is sold by NL Bariod Supplies in a suitable mesh size of 200 mesh (60 to 325 mesh particles of a clay generally being very useful).

As previously indicated, shredded paper is a preferred fibrous material that is optionally, but advantageously, used. U.S. Pat. No. 3,812,615 discloses fibrous material for use in a foam for coating soil with a mulch, the patent being incorporated herein by reference. The foamed material is made from an acrylic polymer, a polyepoxide, a wetting agent, a thickening material, water, and, of course, the fibrous material such as cellulose fibers, including wood pulps and other fiber sources such as old newspapers and cotton linters.

The fibrous material of the present invention includes such above-described fibers and also glass fibers, fibers from rice paper, straw and textile fibers. The fibers are preferably short in length and thin in diameter, about ⅛ inch in diameter and ¼ inch in length being about the maximum size for a sprayable composition. Preferably, as with shredded paper, the fibers are much shorter and thinner. As described in U.S. Pat. No. 3,812,615, the fiber length is preferably less than about ⅛ inch and the average diameter less than about ¼ inch.

In addition, a glue such as guar gum glue can be used to increase the adhesion properties of the composition. As an alternative to guar gum glue, it has been found that a cellulosic polymer (in addition to the cellulosic polymer such as Natrosol described above) can be used to increase the adhesion properties of the composition. One such polymer is available from the Agualon Company of Wilmington, Del. under the tradename Culminal MC.

For many applications, gypsum is used to help provide stiffness and act as a hardener for faster setting up or curing. The specific amount of gypsum which can be used may vary, but is generally at least 0.5% by weight and may be up to 10–15% by weight.

An effective composition which utilizes both the Culminal polymer and gypsum contains the following ingredients in per cent by weight:

| Ingredients | Percent by Weight |
| --- | --- |
| Natrosol polymer | 0.2–1.2% |
| Culminal polymer | 0.1–0.6% |
| Gypsum | 0.5–15.0% |
| Bentonite | 2.0–6.0% |
| Cellulose/wood fiber | 2.0–4.0% |
| Water | 80–95% |

Generally, in the above-noted composition, the amount of Natrosol polymer used will be approximately twice the amount of the Culminal polymer. Also, the amount of carrier or water used will be typically dictated by the desired spraying viscosity of the composition.

Although generally not as important as the preceding materials (especially the polymer, the clay, the carrier and, optionally, the fibrous material, adhesion agent, and gypsum), a surfactant, an anti-foam agent, borax, a dye, and an odor control agent can be used. A preferable odor control agent is sold under the tradename CleanSense and is described in U.S. Pat. No. 4,816,220, herein incorporated by reference. In addition, materials such as fly ash, foundry sand, kiln dust, and bag house dust can be used to replace the fibrous material (preferably only up to about 50% by weight thereof) or even some or all of the clay (but preferably only 5 to 20 wt. % thereof, and usually no more than about 30 to 50 wt. % thereof).

Useful surfactants include biodegradable surfactants such as non-ionic materials such as ethoxylated nonyl phenol (6 mole adduct) that is both water and oil soluble which is very easily used with the preferred carrier of water or even the carrier solvents such as oil, alcohols, methyl ethyl ketone and acetone. A suitable nonionic surfactant is N-60 (Texaco Chemical Co.)

In general, when considering the sprayable composition of the cellulosic polymer (preferably used at about 5 to 50 pounds per 4,000 pounds of carrier that is preferably water) and clay (preferably used at about 25 to 200 pounds per 4,000 pounds of carrier), the optional materials can be used at about the same rate as the cellulosic polymer and the total weight of the additives (not including the fibrous material) is about like that of the clay (about 25 to 200 pounds per 4,000 pounds of carrier).

While the carrier used herein is preferably water, it has been found desirable in some instances to use a carrier other than water. For example, if the composition is used as a covering material at a refuse site, the leachate which is collected at the site can be used as a carrier for the composition. It is believed that recycling the leachate into the site will enhance the natural bacterial action which acts to reduce the volume of the organic refuse, while also eliminating the need to transport leachate to a treatment plant.

A preferred composition has been found to include the following ingredients:

| Ingredients | Percent by Weight |
| --- | --- |
| Natrosol polymer | 0.47–0.53% |
| Culminal polymer | 0.21–0.24% |
| Bentonite | 2.32–5.41% |

| Ingredients | Percent by Weight |
| --- | --- |
| Gypsum | 0.47–1.10% |
| Antifoam | 0.03–0.04% |
| Dye | less than .01% |
| Surfactant | less than .01% |
| Paper | 1.00–00% |
| Wood | 0.25–1.00% |
| Water | 80.00–95.00% |

Generally, the amount of cellulosic fiber (paper and wood) may vary up to 50%. Also, the wood and paper blend may vary. In the example immediately above, the cellulosic fiber materials include approximately 30% wood and 70% paper. However, this may vary up to 70% wood and 30% paper. The cellulosic fiber material may also have cardboard added and include for example, 20% cardboard, 40% wood, and 40% paper.

In addition, if the composition is used as a means of distributing seeds and/or fertilizer over soil, the composition will typically include from 5–30% by weight of seed, and approximately 10% by weight of fertilizer.

The cover layer of the invention usually, after spraying, has a thickness of about 1/16 or ⅛ inch up to 2 to 3 inches, although generally about ¼ to 1 inch is preferred.

The composition and method of the present invention has been described in its preferred embodiments. However, it will be appreciated that modifications can be made to the preferred embodiments without departing from the scope of the attached claims.

What is claimed is:

1. A sprayable composition for forming a cover layer over a selected material, the composition having protective layer forming ingredients, in approximate pounds, consisting essentially of:
   (a) 5 to 50 pounds of a water soluble cellulosic polymer that, after spraying, becomes water repellent;
   (b) 25 to 200 pounds of a clay;
   (c) 10 to 100 pounds of fibrous material; and
   (d) 2000 to 8000 pounds of water as a carrier for the polymer, clay, and the fibrous material, the composition, after spraying, becoming water-resistant, tough and flexible.

2. A composition as defined in claim 1 in which the composition includes a surfactant.

3. A composition as defined in claim 1 in which the composition includes gypsum.

4. A composition as defined in claim 1 in which the composition includes a glue.

5. A composition as defined in claim 4 wherein the glue includes a cellulosic polymer.

6. A composition as defined in claim 1 in which the composition includes borax.

7. A composition as defined in claim 1 in which the composition includes a dye.

8. A composition as defined in claim 1 in which the composition includes a mint oil.

9. A composition as defined in claim 1 in which the following ingredients are present in approximate pounds:

| Ingredients | Pounds |
| --- | --- |
| Cellulosic Polymer | 15–25 |
| Bentonite | 80–120 |
| Shredded Paper | 25–75 |
| Water | 4500–6500. |

10. A composition as defined in claim 1 in which the following ingredients are present in approximate pounds:

| Ingredients | Pounds |
| --- | --- |
| Cellulosic Polymer | 20 |
| Bentonite | 100 |
| Shredded Paper | 50 |
| Water | 4800–5800. |

11. A composition as defined in claim 1 wherein the fibrous material is shredded paper.

12. A composition as defined in claim 1 wherein the fibrous material is wood pulp.

13. A composition as defined in claim 1 wherein the clay is bentonite.

14. A composition as defined in claim 1 in which the polymer is hydroxyethyl cellulose having a viscosity of about 100 to 5000 (Brookfield—#3 spindle).

15. A composition as defined in claim 1 wherein the fibrous material is cotton linters.

16. A composition as defined in claim 1 wherein the carrier water is an aqueous leachate from a disposable site.

17. A composition as defined in claim 1 in which the following additional ingredients are present in approximate pounds:

| Ingredients | Pounds |
| --- | --- |
| Surfactant | 5 to 50 |
| Adhesion agent | 5 to 20 |
| Gypsum | 5 to 100. |

18. A sprayable composition for forming a protective cover layer over material, the composition having protective layer forming ingredients, in approximate % by weight, consisting essentially of:
   (a) about 0.3 to 1.8% of a nonionic water soluble polymer of cellulose that is hydroxyethyl cellulose having a viscosity of about 100 to 500 (Brookfield—#3 spindle);
   (b) about 2 to 6% of bentonite;
   (c) about 2 to 4% of cellulosic fibrous material, the average fiber length being less than about ½ inch and the diameter being about less than about ¼ inch;
   (d) about 0.5 to 15.0% of gypsum; and
   (e) about 80 to 95% of water.

19. A composition as defined in claim 18 in which a dye is present.

20. A composition as defined in claim 18 in which borax is present.

21. A composition as defined in claim 18 in which the cellulosic polymer has a viscosity of about 500 to 2000.

22. A composition as defined in claim 18 in which a surfactant is present.

23. A composition as defined in claim 18 wherein the fibrous material includes shredded paper.

24. A composition as defined in claim 18 wherein the fibrous material includes wood pulp.

25. A composition as defined in claim 18 in which mint oil is present.

26. A composition as defined in claim 18 wherein the water is at least partially provided by leachate from a disposal site.

27. A sprayable composition having protective layer forming ingredients, in approximate percent by weight, consisting essentially of:

| Ingredient | Percent |
| --- | --- |
| Cellulosic Polymer | 0.68–0.77 |
| Bentonite | 2.32–5.41 |
| Gypsum | 0.47–1.10 |
| Dye | less than 0.01 |
| Surfactant | less than 0.01 |
| Paper | 1.00–2.00 |
| Wood | 0.25–1.00 |
| Water | 80.00–95.000. |

28. A method for forming a cover layer over material in a dumpsite or stockpile, the method comprising:
 (A) mixing protective layer forming ingredients, in aproximate pounds, consisting essentially of:
  (a) 5 to 50 pounds of water soluble cellulosic polymer;
  (b) 25 to 200 pounds of a clay;
  (c) 10 to 100 pounds of fibrous material; and
  (d) 2000 to 8000 pounds of water, to form a composition;
 (B) spraying the composition at ambient temperature over the material to form a layer of thickness sufficient to cover and protect the top of the material for a period of time; and
 (C) allowing the sprayed composition to set up to provide a water-repellent, tough and flexible layer.

29. The method according to claim 28 wherein the water is an aqueous leachate collected at the dump site.

30. A method of using a sprayable composition having protective cover forming ingredients for forming a cover layer over a selected material, the method comprising:
 (A) mixing the cover forming ingredients, in approximate pounds, consisting essentially of:
  (a) 5 to 50 pounds of water soluble cellulosic polymer;
  (b) 25 to 200 pounds of clay;
  (c) 10 to 100 pounds of fibrous material; and
  (d) 2000 to 8000 pounds of water; and
 (B) spraying the composition to form a water-resistant and flexible layer over the material.

31. The method according to claim 30 wherein the selected material is refuse at a disposal site.

32. The method according to claim 30 wherein the selected material is soil.

33. A cover layer product produced by the method of claim 30.

34. A cover layer product as defined in claim 33 in which the layer thickness is about 1/16 inch to 3 inches.

* * * * *